Oct. 7, 1941.   W. E. AMBERG   2,258,169
LAMINA FOR ASSEMBLED PISTON RINGS
Filed March 10, 1939
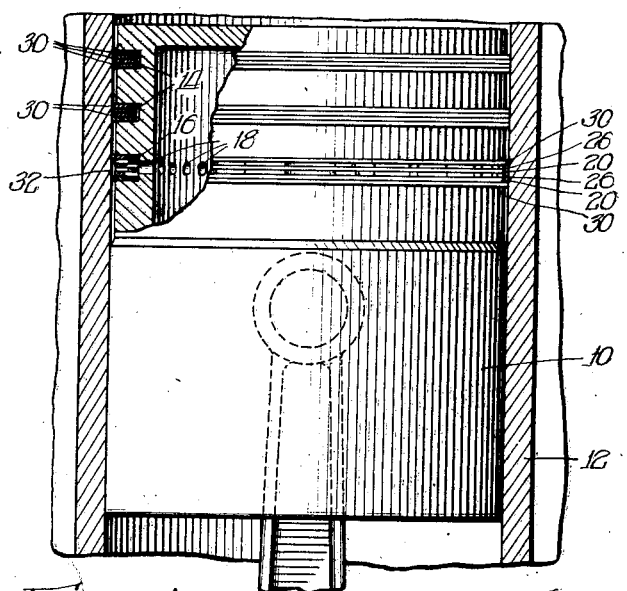
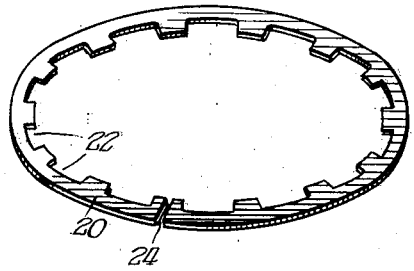
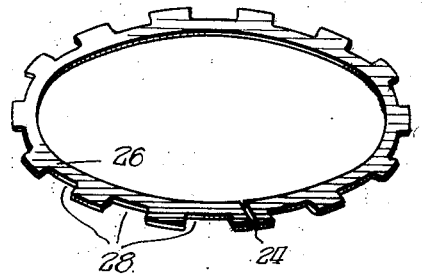
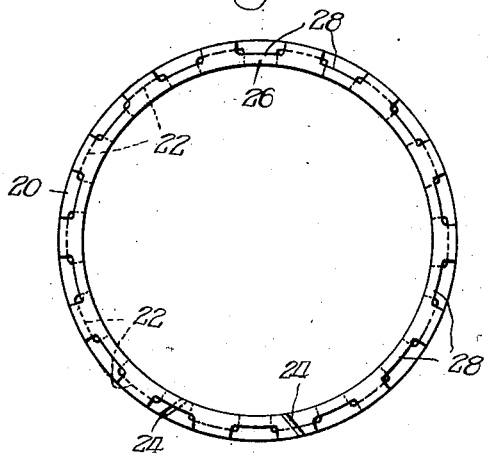
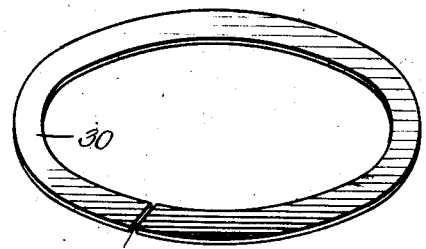
INVENTOR.
Walter E. Amberg,
BY
ATTORNEY.

Patented Oct. 7, 1941

2,258,169

UNITED STATES PATENT OFFICE 2,258,169

LAMINA FOR ASSEMBLED PISTON RINGS

Walter E. Amberg, Chicago, Ill., assignor to Standard Piston Ring Company, Chicago, Ill., a corporation of Illinois Application March 10, 1939, Serial No. 260,991

5 Claims. (Cl. 309—45)

This invention relates to improvements in laminae for assembled piston rings, and more particularly, to an oil piston ring formed of complementary laminae having cut out portions which jointly form oil draining lines.

Piston rings are divided into two groups—the compression rings and the oil rings. The compression rings are intended to prevent the escape of expanding gas between the cylinder and piston walls during the driving stroke of the piston and hence are located on the chamber side of the piston. Usually there are two to five compression rings. The oil rings are located on the crankcase side of the piston and are designed to draw the oil off the piston wall directly into the interior of the piston and return it to the crankcase.

Manufacturers are not agreed as to the proper thickness of a piston ring, just as they are not agreed as to the number of rings required on a piston. Practice, however, is consistent, in that the thickness of the ring grooves varies by multiples of $\frac{1}{32}$ of an inch. Thus, it is possible, and has been done, to provide $\frac{1}{32}$ inch thick piston ring laminae which may be built into a compression piston ring of any desired thickness.

Piston ring laminae heretofore marketed, however, have been useful solely for compression rings. Where used, the manufacturer has still been obliged to buy separate rings for the oil draining grooves. This has militated against the sale of compression ring laminae. Additionally, many of the solid piston rings now on the market are designed to function as either compression or oil rings, which further hurts the development of compression laminae piston rings. Piston ring laminae which may be used to build up either piston or oil rings will have a great market.

I here call attention to the fact that this invention does not relate to two complementary piston rings acting in a single piston groove. The laminae with which I am concerned have a thickness of about $\frac{1}{32}$ of an inch, with all of the attributes incident to such a thickness, and so far as is known, piston ring laminae have never been made to perform an oil draining function.

The principal object of this invention is, therefore, to provide laminated piston ring elements, which, when placed in the oil ring groove of a piston, will jointly perform the function of an oil piston ring.

The second object of this invention is to provide two complementary oil draining laminae, which, when mounted in the piston groove, will perform their oil draining function regardless of their radial relationship to each other.

The third object of this invention is to provide compression and oil draining laminae, which may be produced from steel strips by a punch press and shaping process.

The fourth object of this invention is to provide wall scraping laminae, which with oil draining laminae may form an oil piston ring, or which may be used alone to form a compression piston ring.

These and such other objects as may appear in the disclosure that follows are obtained by the structure shown in the drawings comprising one sheet, which is hereby made a part of this specification, and in which:

Figure 1 is a view partly in elevation and partly in section of my laminae, mounted in the ring grooves of a piston;

Figure 2 is a perspective view of one oil draining lamina;

Figure 3 is a perspective view of a complementary oil draining lamina;

Figure 4 is a view of an oil scraping or compression lamina; and

Figure 5 is a plan view of two complementary oil draining laminae, one imposed upon the other.

Examining the invention and drawings in detail, 10 is a piston which is free to reciprocate in cylinder wall 12. 14 identifies piston ring grooves having a ⅛ inch thickness for compression rings, and 16 is a groove having a $\frac{1}{16}$ inch thickness for an oil ring. Connecting groove 16 with the interior of the piston are ports 18. Numeral 20 identifies one draining lamina, see Figure 2, which is characterized by rectangular notches 22 cut into the inner edge and conventionally split at 24. These notches 22 are cut back into the lamina to a point $\frac{1}{32}$ of an inch beyond the midpoint of the radial width of the lamina 20. The notches 22 are uniformly shaped and spaced. The inside edges of the notches 22 penetrate the midpoint of the radial width of the lamina 20 by a distance exceeding one-half of the circumference of a circle circumscribed at said midpoint. The lamina 26 carries external notches 28, which meet the same requirements as to shape and degree of penetration of the lamina 26 as the internal notches 22 in lamina 20. It will be noted that the external notches 28 are shaped a bit differently from the internal notches 22, because being on the outside of the same sized ring, such alteration in shape is desirable. My third lamina 30 is of the same thickness as the oil laminae 20 and 26, but the normal outside diameter is sufficient to engage a cylinder wall, whereas the normal outside diameter of the oil laminae 20 and 26 is less than the diameter of the piston chamber, so that in a sense these laminae 20 and 26 are spacers between two compression laminae 30, see groove 16 of Figure 1.

Figure 5 shows the two oil draining complementary laminae 20 and 26, superimposed one upon the other, and attention is called to the fact that, so long as the laminae are concentric to one another, their radial position will never completely close a passage from the outer edge to the inner edge. Sometimes the passage is quite broad, but it is never less than a hole about $\frac{1}{16}$ of an inch in diameter, which is ample.

Looking at groove 16, it will be seen that solid ring laminae 30 flank complementary draining laminae 20 and 26, so that the oil draining laminae are brought into alignment with ports 18 in the piston. Where this assembly is followed, the smaller outside diameter of the laminae 20 and 26 creates an annular recess 32, which acts as the conventional oil collecting groove in solid oil piston rings.

The use of my laminae provides certain definite advantages. In order to build up a compression piston ring, four or six of the laminae 30 may be used. When working on the same piston, the mechanic may then utilize two of the compression ring laminae 30 and two or four of the oil draining spacer laminae 20 and 26 to build up the oil ring. My laminae permit the assembly of both compression and oil rings and this creates a market.

The second great advantage of my invention is cheapness of construction. My rings are not cast and ground, but are made from a continuous strip of sheet metal and shaped to obtain the curved product. The notches are stamped into the strip prior to the shaping.

An important feature of the invention lies in the introduction of two complementary oil draining laminae, neither one of which will function alone but which will drain the oil into the piston's interior when used jointly, regardless of the radial position of either. From the viewpoint of making oil laminae by a stamping and shaping process of strip steel, a single lamina cannot be made to drain oil without grooving a flat surface or drilling it horizontally, which is so expensive as to prohibit manufacture. The concept of forming notches in separate rings which will overlap is believed to be new. The oil draining lines pursue a diagonal course through two or more separate ring laminae.

It is apparent that a series of rings may be employed to provide an oil line, as where shallow scallops are cut interiorly and exteriorly in two laminae respectively which are placed one on each side of a lamina perforated by holes, which, when the three rings are concentric, overlap both interior and exterior scallops. Other modifications and alterations may be made in the illustrated form of the invention without departing from the true scope thereof, as set forth in the appended claims.

Having thus described my invention, what I claim as new and desire to secure by Letters Patent of the United States is:

1. A piston ring lamina having in its outer edge elongated, regularly spaced scallops which extend through the full axial thickness of the ring and which penetrate the radial midpoint of said lamina, the width of the penetrations beyond said midpoint by all of the scallops exceeding one-half of the circumference of a circle through said midpoint.

2. An assembled oil piston ring comprising outer compression laminae and complemental spacer laminae, one spacer lamina having notches cut into its outer edge past the radial midpoint of the lamina, and the other having notches cut into its inner edge past the radial midpoint of the lamina, whereby the complemental spacer laminae may cooperate to provide oil ports from the outer to the inner faces of the oil piston ring.

3. An assembled oil piston ring comprising outer compression laminae and complemental spacer laminae, one spacer lamina having in its inner edge regularly spaced notches which penetrate the radial midpoint of said lamina, the width of penetration beyond said midpoint by all of the notches exceeding one-half of the circumference of a circle through said midpoint, and a complementary spacer lamina having notches similarly spaced and similarly penetrating from the outer edge, whereby the complemental spacer laminae may cooperate to provide oil ports from the outer to the inner faces of the oil piston ring.

4. An assembled oil piston ring comprising a plurality of laminae of two types, one type of lamina having notches cut into its outer edge and the other type of lamina having notches cut into its inner edge, said notches overlapping to provide oil passageways regardless of rotational movement of the laminae with respect to each other.

5. An assembled oil piston ring comprising complemental laminae, one lamina having notches cut into its outer edge to a selected depth, the total width of said notches at that depth exceeding one-half of the circumference of a circle at said maximum point of penetration, and the other lamina having notches cut into its inner edge to a depth sufficient to overlap the notches of the first named lamina to provide oil passageways regardless of rotational movement of the laminae with respect to each other.

WALTER E. AMBERG.